Sept. 10, 1940. J. R. THORP ET AL 2,214,513
BUMPER SUPPORTED GUARD
Filed Feb. 9, 1938 2 Sheets-Sheet 1
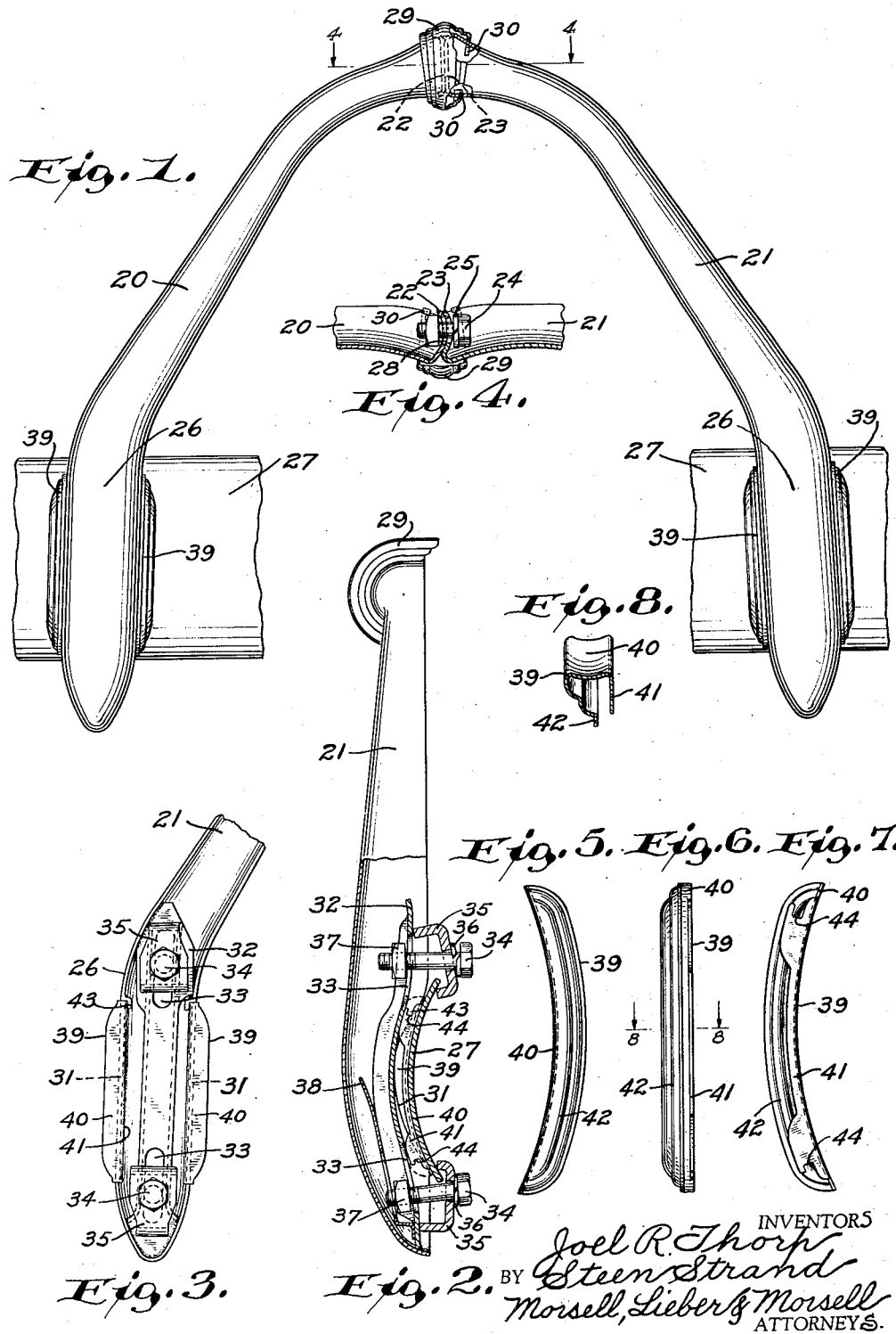

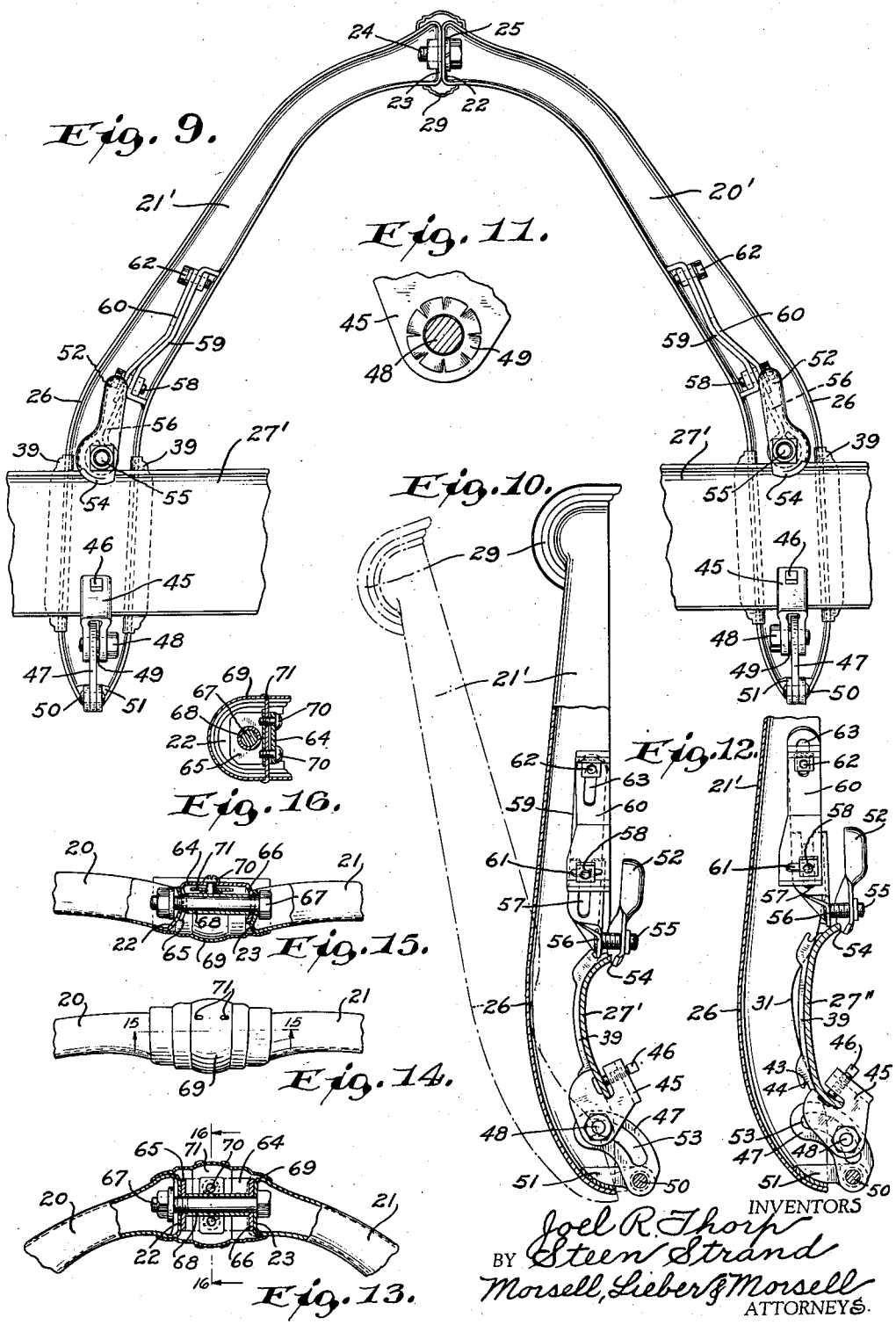

Patented Sept. 10, 1940

2,214,513

UNITED STATES PATENT OFFICE 2,214,513

BUMPER SUPPORTED GUARD

Joel R. Thorp and Steen Strand, West Allis, Wis., assignors, by mesne assignments, to American Chain & Cable Company, Inc., a corporation of New York Application February 9, 1938, Serial No. 189,495

10 Claims. (Cl. 293—55)

Our invention relates in general to improvements in the art of manufacturing protective devices for vehicles, and relates more particularly to improvements in the construction and operation of guards adapted to be mounted upon the bumpers of automobiles for the purpose of protecting adjacent structure such as the radiator grille and body.

Generally defined, an object of our invention is to provide an improved bumper supported guard which is simple and durable in construction and which may be readily applied to a bumper so as to most effectively perform its intended service.

Many different types of bumper supported guards have heretofore been utilized for the purpose of protecting adjacent automobile structure such as the radiator grille, fenders, body and trunk of the vehicle, and in some instances these prior guards have been suspended from the bumpers so as to permit removal thereof for convenient access to trunks or the like. The most common of these prior guards consists merely of a vertically elongated single bar of metal firmly attached to and extending transversely of the horizontal bumper, and another prior type consists of an inverted V-shaped bar having its lower ends rigidly secured to the bumper at horizontally separated points. It has also been proposed to pivotally suspend the prior single bar type of guard so that it could swing outwardly and downwardly away from its carrying bumper, for clearance purposes, but because of the difference in shape of the bumpers for various styles of automobiles, it has not heretofore been attempted to swingably suspend the V-shaped bar type of guard. It has also been difficult with the prior guards, to properly fit them to bumpers having different transverse cross-section, so that the manufacturers of bumper supported guards adapted for use with various styles of bumpers, have heretofore been confronted with many difficult problems.

It is therefore a more specific object of our present invention to provide an improved guard assemblage which may be conveniently applied to and properly associated with bumpers having various shapes in both longitudinal and transverse cross-section, and also having different widths.

Another specific object of our invention is the provision of an improved bumper supported guard of the inverted V or U-shaped type, which can be readily and effectively swingably suspended from a bumper so as to permit convenient removal of the guard for clearance purposes.

A further specific object of the invention is to provide a new and useful guard structure which is exceptionally rigid in construction, which may be manufactured at moderate cost from sheet metal with the aid of punches and dies, and which will moreover present a neat and highly finished appearance when associated with a vehicle.

Still another specific object of this invention is the provision of a guard which may be conveniently applied as an accessory to many types of standard bumpers, and which may also be varied in width to suit the whims of the user.

These and other specific objects and advantages of our invention will be apparent from the following detailed description.

A clear conception of the several features constituting our present improvement, and of the mode of constructing and of applying various types of the improved bumper supported guards, may be had by referring to the drawings accompanying and forming a part of this specification wherein like reference characters designate the same or similar parts in the various views.

Fig. 1 is a front view of one of our improved front grille guards, showing the same applied to fragments of a front automobile bumper, and a portion of the top having been broken away;

Fig. 2 is a part sectional side view of the grille guard shown in Fig. 1;

Fig. 3 is a fragmentary rear view of the grille guard removed from the bumper, and showing one of the clamping or attaching assemblages;

Fig. 4 is a horizontal section taken through a fragment of the upper portion of the grille guard, the section being taken along the line 4—4 of Fig. 1;

Fig. 5 is an enlarged outside view of one of the special adapters for fitting the guard to a bumper;

Fig. 6 is a rear view of the adapter of Fig. 5;

Fig. 7 is an inside view of the same adapter;

Fig. 8 is a further enlarged transverse horizontal section through the adapter, taken along the line 8—8 of Fig. 6;

Fig. 9 is a front view of one of our improved rear trunk guards, showing the same applied to fragments of a rear bumper;

Fig. 10 is a part sectional side view of the swingably suspended trunk guard of Fig. 9, showing the same in dot-and-dash lines swung slightly away from its carrying bumper;

Fig. 11 is an enlarged fragment of the attaching clamp for the trunk guard, showing the clamping washer construction;

Fig. 12 is a fragmentary sectional view similar to that of Fig. 10, but showing the guard applied to a different type of bumper;

Fig. 13 is a part sectional view of the upper portion of one of the improved guards, showing the mode of separating the guard sections so as to increase the overall width of the guard;

Fig. 14 is a top view of the assemblage of Fig. 13;

Fig. 15 is a vertical section through the assemblage of Figs. 13 and 14, taken along the line 15—15 of Fig. 14; and Fig. 16 is a transverse vertical section through the same assemblage, taken along the line 16—16 of Fig. 13.

While our invention has been specifically applied to a generally U-shaped type of guard formed of sheet metal and adapted to be applied to sheet metal bumpers, it is not the intent to thereby unnecessarily restrict the scope, since some of the improved features are more generally applicable to other styles of guards and bumpers.

Referring especially to Figs. 1 to 8 inclusive, the improved grille guard shown therein comprises in general two similar but reversely directed side members 20, 21 formed of sheet metal and having their respective upper ends provided with curved coacting flanges 22, 23 adapted to be adjustably but firmly interconnected by means of a clamping bolt 24 and lock washer 25, while their lower end portions 26 are similarly formed for rigid attachment to a vertically and horizontally curved bumper 27. The adjoining upper flanges 22, 23 of the sections or members 20, 21 are so curved as to permit relative angular adjustment of these sections in such manner that the lower end portions 26 will properly coact with bumpers 27 having different horizontal or longitudinal curvature, and the bolt 24 coacts with slots 28 in the flanges 22, 23, so as to permit such adjustment. The joint between the upper ends of the members 20, 21 may be concealed by means of an ornamental escutcheon plate 29 having ears 30 passing through holes in the member ends or being otherwise secured to the members 20, 21. The members 20, 21 are preferably formed with the aid of punches and dies from relatively heavy sheet metal, and these side members preferably have U-shaped or dished transverse cross-section and have the flanges 22, 23 formed integral therewith.

The lower end portions 26 of the members 20, 21 are of like formation and each of these portions has curved cut-outs or abutments 31 forming laterally spaced abutments, and also has mounted therein a bracket 32 having upper and lower slots 33. These brackets 32 are welded or otherwise rigidly attached to the member ends 26, and the slots 33 are formed for the reception of clamping bolts 34 which coact with bumper engaging clamps 35 through lock washers 36 and which carry clamping nuts 37 at their inner ends within the portions 26. The brackets 32 may also be provided with nut guides 38 as shown in Fig. 2, for conducting the lower nuts 37 into proper position for coaction with the threaded inner ends of the lower bolts 34. Each of the clamps 35 is provided with a short leg adapted to coact with the bumper 27 and with a longer leg formed for coaction with the adjacent bracket 32, and when the bolts 34 and nuts 37 are tightened, the guard assemblage will be firmly attached to the bumper.

The curved abutments 31 will rarely engage the bumpers 27 without producing gaps, and in order to conceal these unsightly gaps between the guard assemblies and bumpers 27 having different width and cross-sectional curvature, we provide improved adapters 39 such as shown in detail in Figs. 5 to 8 inclusive. Each adapter 39 is formed of relatively resilient and easily distortable sheet metal, and has a facing portion 40 adapted to be distorted into snug engagement with the outer face of the bumper 27 and to be engaged by the cut-out abutments 31 of the guard member portions 26. The inner flat side wall 41 of each adapter 39 is formed for distortion into snug coaction with the inner side of the adjacent abutment 31, and the outer side wall 42 is inwardly inclined and is snugly engageable with the outer surface of the corresponding abutment 31. While we have shown an independent adapter 39 for each abutment 31, each adapter may be formed with a wide facing portion 40 and with two oppositely directed outer side walls 42 adapted to coact with the two adjacent abutments 31. When the adapters 39 have been applied to the guard, and the clamping bolts 34 are tightened, it has been found that the adapters 39 will readily distort to the shape of the outer face of the bumper 27, and the facing portion 40 will hug the bumper while the outer wall 42 will always remain in snug engagement with the outer adjacent face of the guard portion 26 to provide a decorative sealing bead which covers the gap between the bumper and the adjacent abutment 31. The guard assembly may therefore be applied to bumpers 27 of different cross-sectional curvature and width, without revealing gaps caused by differences in curvature between the outer bumper face and the curved abutments 31.

The mode of attaching the bumper supported guard of Figs. 1 to 8 inclusive, should be clearly apparent from the foregoing description, and the curvature of the coacting upper flanges 22, 23 will obviously permit relative swinging adjustment of the members 20, 21 so as to bring the cut-out abutments 31 into proper initial engagement with the front face of the bumper 27. After the clamping bolts 34 have been driven home, the adapters 39 will be firmly held in place, and if so desired, each set of these adapters may be connected to each other so as to avoid necessity of handling them separately. However, the adapters 39 may be readily temporarily held and positioned by means of lugs 43 formed on the guard portions 26 and coacting with notches 44 at the ends of the adapter walls 41.

Referring more specifically to the improved trunk guard assemblage of Figs. 9 to 12 inclusive, this guard again comprises two similar but oppositely directed side members 20', 21' firmly interconnected at their upper ends by means of a clamping bolt 24 and lock washer 25 coacting with curved flanges 22, 23 formed integral with the members 20', 21', and each of these members is likewise provided with a lower attaching portion 26 having U-shaped transverse cross-section. Since it is desired to have this trunk guard movably or swingably attached to the rear bumper 27', special mounting means must be provided. This improved mounting which in the present disclosure permits the trunk guard to be swung outwardly away from the bumper 27', comprises in general two bracket elements 45 each adapted to be rigidly attached to the lower portion of the bumper 27' by means of a set screw 46; a link 47 adjustably attachable to each bracket element 45 with the aid of a clamping screw 48 and a toothed lock washer 49; a pivot pin 50 hingedly connecting each link 47 with a bracket 51 rigidly secured to the lower extremity of each member portion 26; and a clamping lever 52 carried by each guard member 20', 21' and coacting with the upper adjacent edge of the bumper 27'. Each of the member portions 26 is likewise provided with curved cut-outs or abutments 31 which may be confined within adapters 39, and the inks 47 are provided with arcuate slots 53 which with the screws 48 released, will permit the pivot pins 50 to be adjusted so as to insure proper clamping coaction of the abutments 31 with the outer face of the bumper 27' as in Fig. 10, or with a bumper 27" of modified shape as shown in Fig. 12. Each of the clamping levers 52 has a cam portion 54 directly engageable with the upper edge portion of the bumper as shown in Figs. 10, 11 and 12, and the several levers 52 are swingably suspended from threaded pivots 55 secured to carrier brackets 56 which are both vertically and horizontally adjustably secured to the adjacent guard members 20', 21'. Each bracket 56 has an upper vertical slot 57 coacting with a clamping bolt 58 which passes through other bracket members 59, 60 and is adjustable along horizontal slots 61 in these members, and the members 59 are permanently attached to the guard portions 26 while the members 60 are slidably and swingably attached to the upper extremities of the members 59 by means of other clamping bolts 62 coacting with slots 63. With this assemblage of elements, the clamping levers 52 may be positioned with respect to the adjacent member portions 26 so as to properly coact with bumpers 27, 27', 27" of various shapes and widths, and the adapters 39 may be utilized with this swing type of guard if the curvature of the abutments 31 does not conform exactly with that of the outer surface of the supporting bumper.

The mode of attaching the swinging type of trunk guard should also be apparent from the foregoing detailed description, and it will also be apparent that when this improved guard is properly applied with the pivot pins 50 in substantial alinement with each other and with the cam portions 54 of the clamping levers 52 adjusted for proper coaction with the bumper, the levers 52 may be swung sidewise about their pivots 55 to quickly release the locking or retaining effect. The guard may be subsequently swung outwardly and downwardly about the pivot pins 50 to any desired extent, and may thereafter be swung back against the bumper and locked in place by manipulation of the cam levers 52.

It may in some cases be desirable to widen the guard assemblage, and with our improved construction, such widening may readily be effected in either the fixed or movable type of guard, in the manner specifically shown in Figs. 13 to 16 inclusive. Here the side members 20, 21 are separated the desired distance, and a spacer 64 is inserted between the flanges 22, 23 of the side members. This spacer 64 has curved end flanges 65, 66 formed for coaction with the flanges 22, 23 respectively, and a long bolt 67 passes through alined slots 28 in all of the flanges. The spacer flanges 65, 66 are spaced apart by means of a sleeve 68 embracing the bolt 67, and an elongated escutcheon cover 69 of decorative design is utilized to conceal the spacer 64 and the joints.

The cover 69 may be detachably secured to the spacer 64 by means of screws 70 coacting with a vertical retainer plate 71, or in any other manner, and the curved surfaces of coaction between the flanges 22, 23, 65, 66 will obviously permit the side members 20, 21 to be adjusted so as to insure proper coaction between the lower abutments 31 and bumpers of various shapes.

From the foregoing detailed description it will be apparent that our present invention provides an improved bumper supported guard assemblage which may be conveniently applied to bumpers of various shapes while preserving a neat and highly finished appearance. Our improved adapters 39 may be readily applied and distorted to conform with the transverse curvature of various types of bumpers, and effectively conceals variations in curvature between the abutments 31 and the outer face of the bumper. This improved adapter may obviously be applied either to the fixed or movable type of guard, and the improved pivotal suspension for the trunk guard may likewise be readily applied to bumpers having various shapes. The adjustments afforded by the links 47 and by the supports for the cam levers 52, will insure proper coaction of the swinging guard with the carrying bumper, while permitting convenient release of the guard for removal or pivoting thereof. The improved spacer cooperable with the flanges 22, 23 of the side members 20, 21 will also permit ready variation in the overall width of the guard, and the various elements of the structure may be readily manufactured from sheet metal with the aid of punches and dies and produce a durable assemblage when properly associated with each other. The invention has proven highly successful in actual commercial use and produces a guard assemblage which is extremely attractive in appearance and which may be readily applied to most standard automobile bumpers.

It should be understood that it is not desired to limit this invention to the exact details of construction or to the precise mode of use, herein shown and described, for various modifications within the scope of the claims, may occur to persons skilled in the art.

We claim:

1. A bumper supported guard, comprising, a guard member having a lower abutment facing the supporting bumper, a clamping bracket attachable to an edge portion of the bumper, a link adjustably attachable to said bracket, a pivot pin connecting said link and said member to permit swinging of said abutment toward and away from said bumper, and clamping means interposed between said member and the bumper remote from said pin.

2. A bumper supported guard, comprising, a guard member having a lower abutment facing the supporting bumper, a clamping bracket attachable to an edge portion of the bumper, a link adjustably attachable to said bracket, a pivot pin connecting said link and said member to permit swinging of said abutment toward and away from said bumper, clamping means interposed between said member and the bumper remote from said pin, and means for effecting both horizontal and vertical adjustment of said clamping means.

3. A bumper supported guard, comprising, a guard member having a lower abutment facing the supporting bumper, a clamping bracket attachable to an edge portion of the bumper, a link adjustably attachable to said bracket, a pivot pin connecting said link and said member to permit swinging of said abutment toward and away from said bumper, and a releasable clamp carried by said member and coacting with the edge portion of the bumper remote from said pivot pin.

4. A bumper supported guard, comprising, a guard member having a lower abutment facing the supporting bumper, a clamping bracket attachable to an edge portion of the bumper, a link adjustably attachable to said bracket, a pivot pin connecting said link and said member to permit swinging of said abutment toward and away from said bumper, a releasable clamp carried by said member and coacting with the edge portion of the bumper remote from said pivot pin, and means for effecting both vertical and horizontal adjustment of said clamp relative to said member.

5. A bumper supported guard, comprising, an inverted U-shaped guard having laterally spaced lower abutments cooperable with the outer surface of a bumper, a bracket element attachable to the lower edge portion of the bumper adjacent each abutment, a link adjustably associated with each of said elements, a pivot pin connecting each link with the lower portion of said guard near each of said abutments, and clamping means interposed between said guard and the upper edge of the bumper adjacent each of said abutments.

6. A bumper supported guard, comprising, an inverted U-shaped guard having laterally spaced lower abutments cooperable with the outer surface of a bumper, a bracket element attachable to the lower edge portion of the bumper adjacent each abutment, a link adjustably associated with each of said elements, a pivot pin connecting each link with the lower portion of said guard near each of said abutments, and a releasable clamping lever carried by said guard adjacent each of said abutments and coacting with the upper edge portion of the bumper.

7. A bumper supported guard, comprising, an inverted U-shaped guard having laterally spaced lower abutments cooperable with the outer surface of a bumper, a bracket element attachable to the lower edge portion of the bumper adjacent each abutment, a link adjustably associated with each of said elements, a pivot pin connecting each link with the lower portion of said guard near each of said abutments, clamping means interposed between said guard and the upper edge of the bumper adjacent each of said abutments, and means for effecting both vertical and horizontal adjustment of said clamping means.

8. A bumper supported guard, comprising, an inverted U-shaped guard having laterally spaced lower abutments cooperable with the outer surface of a bumper, a bracket element attachable to the lower edge portion of the bumper adjacent each abutment, a link adjustably associated with each of said elements, a pivot pin connecting each link with the lower portion of said guard near each of said abutments, a releasable clamping lever carried by said guard adjacent each of said abutments and coacting with the upper edge portion of the bumper, and means for effecting independent vertical and horizontal adjustment of said clamping levers.

9. In a bumper assembly the combination with a horizontal bumper bar having a curved outer face and a vertical guard mounted thereon and having a curved recess to fit approximately the outer face of the bumper bar, an adapter extending along the face of the bumper bar and lying between the outer face of the bumper bar and the recess on the guard, said adapter being of distortable construction and having a base portion adjacent the outer face of the bumper bar and a channel to receive the edge of the guard, one wall at least of which is of height sufficient when the guard and bumper bar are drawn together, to cover any gap between the edge of the guard and the face of the bumper, and means to draw the guard against the bumper with sufficient force to cause the base portion of the adapter substantially throughout its length to bear against the face of the bumper bar.

10. In a bumper assembly the combination with a horizontal bumper bar having a curved outer face and a vertical guard mounted thereon and having a curved recess to fit approximately the outer face of the bumper bar, an adapter extending along the face of the bumper bar and lying between the outer face of the bumper bar and the recess on the guard, said adapter being made of metal and of a deformable construction having a base portion adjacent the outer face of the bumper bar and a channel to receive the edge of the guard, one wall at least of which is of height sufficient when the guard and bumper bar are drawn together to cover any gap between the edge of the guard and the face of the bumper, and means to draw the guard against the bumper with sufficient force to cause the base portion of the adapter substantially throughout its length to bear against the face of the bumper bar.

JOEL R. THORP.
STEEN STRAND.